US007508650B1

(12) United States Patent
Bluvstein et al.

(10) Patent No.: US 7,508,650 B1
(45) Date of Patent: Mar. 24, 2009

(54) ELECTRODE FOR ELECTROCHEMICAL CAPACITOR

(75) Inventors: Alexander Bluvstein, Dimona (IL); Alexander Osherov, Beer Sheva (IL)

(73) Assignee: More Energy Ltd., Yehud (IL)

( * ) Notice: Subject to any disclaimer, the term of this patent is extended or adjusted under 35 U.S.C. 154(b) by 818 days.

(21) Appl. No.: 10/858,401

(22) Filed: Jun. 2, 2004

Related U.S. Application Data

(60) Provisional application No. 60/474,933, filed on Jun. 3, 2003.

(51) Int. Cl.
*H01G 9/00* (2006.01)
(52) U.S. Cl. ....................... 361/502; 361/503; 29/25.03
(58) Field of Classification Search ......... 361/502–503, 361/508, 516, 528, 532; 29/25.03
See application file for complete search history.

(56) References Cited

U.S. PATENT DOCUMENTS

| | | | |
|---|---|---|---|
| 4,615,829 A | 10/1986 | Tamura et al. | |
| 4,636,430 A | 1/1987 | Moehwald | |
| 4,731,408 A | 3/1988 | Jasne | |
| 4,737,889 A * | 4/1988 | Nishino et al. | ............... 361/502 |
| 4,762,644 A | 8/1988 | Kobayashi et al. | |
| 4,820,595 A | 4/1989 | MacDiarmid et al. | |
| 4,858,078 A * | 8/1989 | Morimoto et al. | ........... 361/527 |
| 4,940,640 A | 7/1990 | MacDiarmid | |
| 4,959,430 A | 9/1990 | Jonas et al. | |
| 4,987,042 A | 1/1991 | Jonas et al. | |
| 5,023,149 A | 6/1991 | MacDiarmid et al. | |
| 5,035,926 A | 7/1991 | Jonas et al. | |
| 5,093,439 A | 3/1992 | Epstein et al. | |
| 5,150,283 A * | 9/1992 | Yoshida et al. | ............... 361/502 |
| 5,284,723 A | 2/1994 | Hannecart et al. | |
| 5,300,575 A | 4/1994 | Jonas et al. | |
| 5,312,681 A | 5/1994 | Muys et al. | |
| 5,354,613 A | 10/1994 | Quintens et al. | |
| 5,370,981 A | 12/1994 | Krafft et al. | |
| 5,372,924 A | 12/1994 | Quintens et al. | |
| 5,391,472 A | 2/1995 | Muys et al. | |
| 5,403,467 A | 4/1995 | Jonas et al. | |
| 5,443,944 A | 8/1995 | Krafft et al. | |
| 5,463,056 A | 10/1995 | Jonas | |
| 5,527,640 A * | 6/1996 | Rudge et al. | ................. 429/213 |
| 5,575,898 A | 11/1996 | Wolf et al. | |
| 5,665,498 A | 9/1997 | Savage et al. | |
| 5,674,654 A | 10/1997 | Zumbulyadis et al. | |
| 5,716,550 A | 2/1998 | Gardner et al. | |
| 5,747,412 A | 5/1998 | Leenders et al. | |
| 6,060,116 A | 5/2000 | Kulkarni et al. | |
| 6,242,561 B1 | 6/2001 | Mohwald et al. | |
| 6,430,033 B1 * | 8/2002 | Mitsui et al. | ................. 361/525 |
| 6,451,074 B2 | 9/2002 | Bluvstein et al. | |
| 2002/0042976 A1 * | 4/2002 | Shin et al. | ................... 29/25.03 |
| 2002/0089807 A1 | 7/2002 | Bluvstein et al. | |
| 2002/0114128 A1 | 8/2002 | Ryu et al. | |
| 2002/0167784 A1 * | 11/2002 | Takatomi et al. | ............ 361/502 |

FOREIGN PATENT DOCUMENTS

WO 97121228 6/1997

OTHER PUBLICATIONS

Akundi, G.S. et al., Journal of Applied Polymer Science, vol. 83, pp. 1970-1977 (2002).

* cited by examiner

*Primary Examiner*—Eric Thomas
(74) *Attorney, Agent, or Firm*—Greenblum & Bernstein, P.L.C.

(57) ABSTRACT

An electrode for an electrochemical capacitor which comprises a porous carbon substrate having thereon at least a first or innermost layer comprising a first inherently conductive polymer and a second or outermost layer comprising a second inherently conductive polymer. This abstract is neither intended to define the invention disclosed in this specification nor intended to limit the scope of the invention in any way.

115 Claims, No Drawings

US 7,508,650 B1

ELECTRODE FOR ELECTROCHEMICAL CAPACITOR

CROSS-REFERENCE TO RELATED APPLICATIONS

The present application claims the benefit under 35 U.S.C. §119(e) of U.S. Provisional Patent Application No. 60/474,933 filed on Jun. 3, 2003, the disclosure of which is expressly incorporated by reference herein in its entirety.

BACKGROUND OF THE INVENTION

1. Field of the Invention

The present invention relates to an electrode for an electrochemical capacitor which comprises an inherently conductive polymer, and to a process for the production thereof. The invention also relates to an electrochemical capacitor which comprises such an electrode.

2. Discussion of Background Information

Electrochemical capacitors (sometimes also referred to as "supercapacitors") are devices which comprise two electrodes which are separated by a liquid or solid electrolyte. Electrical energy is stored at the electrode/electrolyte interface. This type of energy storage has recently attracted increased attention due to the application of new materials which allow high charge densities, i.e., high surface area activated carbons, metal oxides and electrically conducting polymers, and the potential for increased capacitance associated therewith.

Although the overall structure of an electrochemical capacitor is similar to that of an electrochemical battery, there are significant differences between these two types of energy storage devices. For example, in the electrochemical capacitor, energy storage is by means of static charge rather than by an electrochemical process that is inherent to the battery. Moreover, whereas the electrochemical battery delivers a fairly steady voltage in the usable energy spectrum, the voltage of the electrochemical capacitor is linear and drops evenly from full voltage to zero volts. Accordingly, rather than operating as a main battery, electrochemical capacitors are more commonly used as memory backup to bridge short power interruptions. Another application is improving the current handling of a battery. The electrochemical capacitor is placed in parallel to the battery terminal and provides current boost on high load demands. The electrochemical capacitor may also find use in portable fuel cells to enhance peak-load performance. The main advantages of electrochemical capacitors in comparison with batteries are a much higher power density (i.e., short charge and discharge times) and thermal stability (usually from −5° C. to 85° C.), as well as an excellent cycle life (usually more than 100,000 cycles). New materials of high charge density will foster the miniaturization of electrochemical capacitors and, therefore, make them more suitable for use in portable electrical devices such as, e.g., notebook PCs and cellular phones. Examples of potential fields of application of electrochemical capacitors, in addition to their use as memory backup in computers, telecommunications and consumer electronics, are electric vehicles (capacitor-battery hybrid), automotive subsystems (catalyst preheating, cold-start assistance), industrial (factory automation, robotics), and military applications (electric subsystems, "silent" vehicles).

SUMMARY OF THE INVENTION

The present invention provides an electrode for an electrochemical capacitor, in particular, a so-called "redox supercapacitor" or "pseudo supercapacitor". The electrode comprises a porous carbon substrate having thereon a first or innermost layer which comprises a first inherently conductive polymer and a second or outermost layer which comprises a second inherently conductive polymer.

In one aspect of the electrode, the porous carbon substrate preferably has a specific surface area of at least about 20 $m^2/g$, e.g., at least about 50 $m^2/g$.

In another aspect, the porous carbon substrate preferably comprises a carbon felt, a non-woven carbon cloth, or pressed carbon fibers.

In another aspect, the porous carbon substrate preferably also comprises a binder such as, e.g., polytetrafluoroethylene. The binder may be present in an amount of about 5% by weight to about 40% by weight, based on the total weight of the carbon substrate.

In yet another aspect, the carbon substrate preferably has a two-dimensional structure. For example, the carbon substrate may have an average thickness of from about 0.04 mm to about 1 mm. The first and second layers may be provided on both sides of the carbon substrate.

In still another aspect, the weight ratio of the carbon of the carbon substrate and the first layer preferably is from about 1:0.5 to about 1:10.

In another aspect of the electrode, the weight ratio of the first layer and the second layer preferably is from about 1:0.5 to about 1:5.

In another aspect of the electrode of the invention, the first layer and second layer on the carbon substrate preferably have independently been formed by a process comprising a dipping process, a chemical polymerization process in the presence of the carbon substrate, or an electrochemical polymerization process in the presence of the carbon substrate. In another aspect, the first layer and the second layer may have been formed by different processes. For example, the first layer may have been formed by a dipping process or a chemical polymerization process and/or the second layer may have been formed by an electrochemical polymerization process.

In yet another aspect of the electrode of the present invention, the first inherently conductive polymer and the second inherently conductive polymer preferably comprise the same monomer units. The first inherently conductive polymer and the second inherently conductive polymer may, for example, have main chains composed of monomer units comprising a heteroaromatic ring which comprises N, S and/or O, or of monomer units comprising an aromatic ring which has at least one heteroatom such as, e.g., N, S and/or O bonded thereto. Accordingly, the first inherently conductive polymer and the second inherently conductive polymer independently may be selected from, e.g., polyaniline, polypyrrole, polythiophene and ring-substituted derivatives thereof. For example, the first inherently conductive polymer and/or the second inherently conductive polymer may comprise polyaniline.

In an exemplary embodiment of the electrode of the present invention, the first inherently conductive polymer and the second inherently conductive polymer comprise polyaniline and the first layer has been formed by a dipping process or a chemical polymerization process in the presence of the carbon substrate and the second layer has been formed by an electrochemical polymerization process in the presence of the carbon substrate having the first layer thereon.

In another aspect of the present electrode, preferably the first layer and the second layer further comprise a dopant. The dopant may be an organic acid or an inorganic acid and/or may have a $pK_a$ value of not higher than about 2. The organic acid may be a carboxylic acid, a sulfonic acid and/or a phosphonic acid. The sulfonic acid may be an aromatic sulfonic acid and/or may be selected from, e.g., dodecylbenzenesulfonic acid, octylbenzenesulfonic acid, toluenesulfonic acid, benzenesulfonic acid, naphthalenesulfonic acid, naphthalenedisulfonic acid, pyrenesulfonic acid, methanesulfonic acid, trifluoromethanesulfonic acid, camphorsulfonic acid and/or polystyrenesulfonic acid.

In another aspect, the dopant may comprise $H_2SO_4$, $H_3PO_4$, $HBF_4$, $HPF_6$, $HAsF_6$, $HSbF_6$ and/or $HClO_4$. In yet another aspect, in both the first layer and the second layer the weight ratio of the inherently conductive polymer and the dopant may be in the range of from about 3:1 to about 1.5:1. The dopant of the first layer and the dopant of the second layer may be the same or different.

In a yet another aspect of the present electrode, the first layer and/or the second layer may further comprise carbon particles. The carbon particles may, for example, be in the form of fibers, flakes or spheres and/or may have a specific surface area of at least about 4 $m^2/g$. In one aspect, the carbon particles are preferably present in an amount of from about 2% by weight to about 6% by weight, based on the dry weight of the inherently conductive polymer in the respective layer.

In yet another aspect of the present electrode, the first and/or the second layer may further comprise Pb and/or a transition metal in finely divided form. The transition metal preferably is selected from Ir, Ru, Rh, Pd, Pt, Cd and combinations of two or more thereof.

In another aspect, the electrode has an area capacitance of at least about 1.5 $F/cm^2$, e.g., at least about 1.8 $F/cm^2$, and/or a capacitance density of at least about 40 $F/cm^3$, e.g., at least about 50 $F/cm^3$, and/or a specific capacitance of at least about 70 $F/g$, e.g., at least about 100 $F/g$. For example, the electrode may have an area capacitance of at least about 2.0 $F/cm^2$, a capacitance density of at least about 60 $F/cm^3$ and a specific capacitance of at least about 110 $F/g$.

In another aspect, the electrode preferably has an average total thickness (carbon substrate plus layers arranged thereon) of from about 0.1 mm to about 2 mm.

The present invention further provides an electrochemical capacitor which comprises a first electrode, a second electrode and an electrolyte and wherein the first and/or the second electrode is an electrode of the present invention as set forth above, including the various aspects thereof. If both of the electrodes of the electrochemical capacitor are electrodes of the present invention, they may be the same or different. If different, at least one of the inherently conductive polymers of the first electrode may be different from at least one of the inherently conductive polymers of the second electrode.

In another aspect, preferably the first and second inherently conductive polymers of the first electrode comprise the same monomer units and/or the first and second inherently conductive polymers of the second electrode comprise the same monomer units.

In another aspect of the electrochemical capacitor of the present invention, the electrolyte may be a liquid electrolyte. Alternatively, the electrolyte may comprise a solid electrolyte which is arranged between the first and second electrodes. For example, the solid electrolyte may comprise a polymer membrane which is in contact with the first and second electrodes, and may further comprise an inorganic acid and/or an organic acid. In one aspect, this acid preferably has a $pK_a$ value of not higher than about 2.

The present invention further provides an electrical device which comprises the electrochemical capacitor set forth above, including the various aspects thereof.

In one aspect, the electrical device may be a computer, a telecommunication device or a consumer electronics device.

In another aspect it may be an automobile. In yet another aspect, it may be an industrial roboter.

The present invention also provides a process for making the electrode of the present invention as set forth above, including the various aspects thereof. According to this process, a first or innermost layer comprising a first inherently conductive polymer and a second or outermost layer comprising a second inherently conductive polymer are formed on a porous carbon substrate.

In one aspect of the process, the formation of the first layer preferably may comprise a dipping of the carbon substrate into a liquid which contains said first inherently conductive polymer. This liquid may comprise, e.g., a solution, dispersion and/or emulsion which contains said first inherently conductive polymer and a solvent. The solvent may comprise an organic solvent such as, e.g., an aromatic hydrocarbon. For example, the organic solvent may be selected from benzene, toluene and/or the xylenes.

In another aspect of the process of the present invention, the liquid preferably further contains a dopant, e.g., the dopant set forth above, including the various aspects thereof.

In another aspect, the liquid contains the first inherently conductive polymer preferably in an amount of about 3% by weight to about 10% by weight, based on the total weight of the liquid and/or the weight ratio of the first inherently conductive polymer and the dopant is in the range of from about 3:1 to about 1.5:1.

In yet another aspect of the present process, the formation of the first layer may comprise a chemical polymerization of one or more monomers for the first inherently conductive polymer in the presence of said carbon substrate. This polymerization may, for example, comprise the contacting of said one or more monomers with an oxidant. In one aspect, the carbon substrate carries the oxidant. In another aspect, the oxidant is added to the polymerization mixture. According to yet another aspect, the polymerization is carried our in an aqueous medium.

In another aspect, the polymerization preferably is carried out in the additional presence of an organic acid and/or an inorganic acid having a $pK_a$ value of not higher than about 2. The weight ratio of the inherently conductive polymer and the acid may, for example, be in the range of from about 3:1 to about 1.5:1.

In yet another aspect, the polymerization may be carried out in the additional presence of the carbon particles set forth above, including the various aspects thereof. For example, the carbon particles may be employed in an amount of from about 2% by weight to about 6% by weight, based on the dry weight of the inherently conductive polymer after polymerization.

In a still further aspect of the process of the present invention, the second layer is preferably formed by a process which comprises an electrochemical polymerization of one or more monomers for said second inherently conductive polymer in the presence of the carbon substrate having the first layer thereon. This polymerization may, for example, be carried out in an aqueous medium.

In another aspect, the polymerization is preferably carried out in the additional presence of an organic acid and/or an inorganic acid having a $pK_a$ value of not higher than about 2. The weight ratio of the inherently conductive polymer and the acid may, for example, be in the range of from about 3:1 to about 1.5:1.

In yet another aspect, the polymerization may be carried out in the additional presence of the carbon particles set forth above, including the various aspects thereof. For example, the carbon particles may be employed in an amount of from about 2% by weight to about 6% by weight, based on the dry weight of the inherently conductive polymer after polymerization.

In a still further aspect, the electrochemical polymerization is preferably carried out by a process which comprises cyclic voltammetry.

Further, according to an exemplary embodiment of the present process, the first layer is formed by a process which comprises dipping the carbon substrate into a liquid which contains said first inherently conductive polymer, and the second layer is formed by a process which comprises an electrochemical polymerization of one or more monomers for said second inherently conductive polymer in the presence of the carbon substrate having said first layer thereon.

According to another exemplary embodiment of the present process, the first layer is formed by a process which comprises a chemical polymerization of one or more monomers for said first inherently conductive polymer in the presence of said carbon substrate, and the second layer is formed by a process which comprises an electrochemical polymerization of one or more monomers for said second inherently conductive polymer in the presence of the carbon substrate having said first layer thereon.

The present invention also provides an electrode for an electrochemical capacitor which has been made by the process set forth above, including the various aspects thereof.

The present invention also provides an electrode for an electrochemical capacitor which comprises a carbon substrate having a specific surface area of at least about 20 $m^2/g$. Arranged on the carbon substrate is at least one layer which comprises an inherently conductive polymer. This polymer has a main chain composed of monomer units which comprise a heteroaromatic ring having at least one heteroatom selected from N, S and O.

Specific aspects of this electrode include those which are set forth above for the electrode comprising at least a first layer and a second layer, where applicable.

The present invention further provides an electrode for an electrochemical capacitor which comprises a carbon substrate having a specific surface area of at least 200 $m^2/g$, e.g., at least about 500 $m^2/g$. Arranged on the carbon substrate is at least one layer which comprises polyaniline and/or a ring-substituted derivative thereof.

Exemplary aspects of this electrode include those which are set forth above for the electrode comprising at least a first layer and a second layer, where applicable.

An electrochemical capacitor which comprises at least one of the electrodes set forth above is also provided by the present invention.

The porous carbon substrate for the electrode according to the present invention will usually have a specific surface area (as measured according to the BET method using nitrogen gas) of at least about 20 $m^2/g$, e.g., at least about 30 $m^2/g$, at least about 40 $m^2/g$, at least about 50 $m^2/g$, at least about 100 $m^2/g$, at least about 200 $m^2/g$, at least about 500 $m^2/g$, or at least about 1000 $m^2/g$. There is no upper limit for the specific surface area of the carbon substrate other than the availability of corresponding materials. Carbon substrates having an as high specific surface area as 5000 $m^2/g$ may soon be commercially available. Non-limiting examples of commercially available materials which are suitable for use as the porous carbon substrate of the present invention are the carbon electrodes available from W. L. Gore & Associates, Inc., Newark, Del. (e.g., those sold under the trademark EXCELLERATOR®). Of course, the porous carbon substrate may comprise any other materials which, in combination with the inherently conductive polymer layers arranged thereon, provide the desired capacitance for a specific application. Non-limiting examples of such materials are carbon felt, nonwoven carbon cloth, and pressed high surface area carbon fibers.

The porous carbon substrate may comprise other, optional materials in addition to carbon. A non-limiting example of an optional material is a binder for holding together the individual carbon constituents such as, e.g., carbon particles and/or carbon fibers. Suitable binders include those which do not interfere with the electro-conductive properties of the carbon. In general, the binder will be an organic polymer, for example, polytetrafluoroethylene. The binder will usually be present in an amount which is not lower than about 5% by weight and not higher than about 40% by weight, based on the total weight of the carbon substrate (including carbon, binder and any other optional components that may be present).

The carbon substrate may take any two- or three-dimensional shape, for example, rod, cylinder, sphere or segment thereof, and sheet. A preferred carbon substrate is a carbon substrate which has a two-dimensional (sheet) structure. The thickness (average of at least 5 measurements) of the carbon substrate in the case of a two-dimensional structure will usually be not smaller than about 0.04 mm, e.g., not smaller than about 0.08 mm, and not larger than about 1 mm, e.g., not larger than about 0.5 mm. A carbon substrate such as a felt, etc. usually does not have a completely uniform thickness, wherefore only an average thickness thereof can be determined.

The substantially entire outer (and inner) surface area of the porous carbon substrate may be covered with the first and second layers. Alternatively, only a part of the outer (and inner) surface area of the carbon substrate may be covered with these layers. Likewise, the second or outermost layer may cover the substantially entire surface area of the first layer or only a part thereof. For example, in the case of a two-dimensional carbon substrate, one or both sides of the substrate may have the first and second layers arranged thereon. In most cases, however, the carbon substrate will be substantially completely covered by the first layer. Also, the second layer will usually extend across the substantially entire surface (opposite to the surface which is in contact with the electrode) of the first layer.

In this regard, it should be noted that the electrode of the present invention may comprise a porous carbon substrate having more than two layers thereon. For example, a third layer may be arranged between the first layer and the second layer. This third layer may comprise an inherently conductive polymer (e.g., a polymer which is the same or different from the inherently conductive polymer of the first or second layer) or any other electrically conductive material that does not interfere with the conductivity of the first and second layers. If the third layer comprises an inherently conductive polymer which is composed of the same monomer units that constitute the inherently conductive polymer(s) of the first and/or second layer, it may have been formed by a process that is different from the process(es) used for forming the first and second layers and/or it may be different from the first and second layers in some other respect(s) (e.g., by containing or not containing additional materials such as carbon particles and/or transition metals). Of course, it is also possible to arrange more than one additional layer (e.g., two or three additional layers) between the first and second layers.

The weight ratio of the carbon of the carbon substrate (i.e., without any binder and other optional constituents) and the first layer is not particularly limited and may vary over a wide range, in part also depending on the nature (porosity) of the specific carbon substrate and the specific inherently conductive polymer. Usually this weight ratio will be not higher than about 1:0.5, e.g., not higher than about 1:1, and not lower than about 1:10, e.g., not lower than about 1:5.

The weight ratio of the first layer and the second layer also is not particularly limited and may vary over a wide range. Usually this weight ratio will be not higher than about 1:0.5, e.g., not higher than about 1:1, and not lower than about 1:5, e.g., not lower than about 1:3.

The inherently conductive polymers for use in the present invention comprise polymers which are capable of conducting electricity in their doped state. Such polymers may comprise chains composed of resonant (aromatic and/or heteroaromatic) rings in which conjugation extends from one end of the chain to the other end. The (hetero)aromatic rings may be bonded to each other and/or through suitable bridging groups such as, e.g., heteroatoms having free electron pairs (e.g., N, S, O) and/or groups comprising two atoms bonded by a double or triple bond (e.g., —CH=CH— or —CH=CH—CH=CH—). Non-limiting examples of inherently conductive base polymers suitable for use in the present invention are polyaniline, polypyrrole, polyacetylene, polythiophene, polyfurane, poly-p-phenylene, poly(p-phenylene sulfide) and poly-N-vinylcarbazole. These and other polymers may also comprise substituents in the basic skeleton, particularly, one or more (e.g., two) substituents (such as, e.g., alkyl, alkoxy, alkoxyalkyl, acyl, thioacyl, acyloxy and thioacyloxy groups having up to 20, e.g., up to 10 carbon atoms) bonded to the ring structures thereof. Non-limiting examples of inherently conductive polymers suitable for use in the present invention are the substituted and unsubstituted pyrrole-containing polymers disclosed in U.S. Pat. Nos. 5,665,498 and 5,674,654; the substituted and unsubstituted thiophene-containing polymers disclosed in U.S. Pat. Nos. 4,731,408; 4,959,430; 4,987,042; 5,035,926; 5,300,575; 5,312,681; 5,354,613; 5,370,981; 5,372,924; 5,391,472; 5,403,467; 5,443,944; 5,463,056; 5,575,898; 5,747,412 and 6,242,561; and the substituted and unsubstituted aniline-containing polymers disclosed in U.S. Pat. Nos. 4,615,829; 4,762,644; 5,716,550; 5,093,439; and 6,060,116; as well as the polymers disclosed in WO 97/21228. The entire disclosures of these documents are hereby incorporated herein by reference.

Both the first and the second layer may comprise more than one inherently conductive polymer. By way of non-limiting example, these layers may comprise a blend of two or three inherently conductive polymers, e.g., a blend of a polyaniline and a polypyrrole, or a blend of a polythiophene and a (ring-) substituted polythiophene. Usually, however, the first and second layers (and any optional additional layers) will comprise only a single kind of inherently conductive polymer.

The first inherently conductive polymer and the second inherently conductive polymer may comprise the same or different monomer units. Usually they will be composed of the same monomer units. Moreover, the first and second inherently conductive polymer will usually be homopolymers, i.e., will be composed of a single type of monomer unit. For example, the first inherently conductive polymer and/or the second inherently conductive polymer may comprise polyaniline.

While the first and second layers may not differ with respect to the type of inherently conductive polymer(s) included therein, the processes for forming these layers will usually be different. By way of non-limiting example, the first layer may have been formed by a dipping process or a chemical polymerization process in the presence of the carbon substrate and the second layer may have been formed by an electrochemical polymerization process in the presence of the carbon substrate having the first layer thereon. Regarding the dipping process, the inherently conductive polymers for preparing a dipping liquid may be synthesized by methods which are well known to those skilled in the art, non-limiting examples whereof are disclosed in the documents listed above and, additionally, in U.S. Pat. No. 4,636,430, the entire disclosure whereof is hereby incorporated by reference herein. For example, the inherently conductive polymers can be prepared by a chemical or electrochemical polymerization of the corresponding monomers. Corresponding processes will be explained in detail below.

The first layer and/or the second layer (preferably both layers) will usually also comprise a dopant for rendering the inherently conductive polymers electrically conducting. Dopants for inherently conductive polymers are well known to those skilled in the art and are, for example those given in the above-referenced documents. The dopant for use in the present invention will usually be an organic acid and/or inorganic acid. Moreover, the dopant will preferably be a relatively strong acid, i.e., will have a $pK_a$ value of not higher than about 2, e.g., not higher than about 1.5.

Non-limiting examples of suitable dopants for use in the present invention are mono- and polycarboxylic acids (such as, e.g., formic acid, trifluoroacetic acid, trichloroacetic acid, acetic acid and oxalic acid), aliphatic and aromatic sulfonic acids (such as, e.g., methanesulfonic acid, trifluoromethanesulfonic acid, dodecylbenzenesulfonic acid, octylbenzenesulfonic acid, toluenesulfonic acid, benzenesulfonic acid, naphthalenesulfonic acid, naphthalenedisulfonic acid, pyrenesulfonic acid, camphorsulfonic acid and/or polystyrenesulfonic acid) and aliphatic or aromatic phosphonic acids (such as, e.g., pentadecylphenylphosphonic acid) and any combinations thereof.

Non-limiting examples of inorganic acids which are suitable as dopants for use in the present invention are $H_2SO_4$, $H_3PO_4$, $HBF_4$, $HPF_6$, $HAsF_6$, $HSbF_6$ and $HClO_4$.

Another non-limiting example of a dopant which is suitable for the purposes of the present invention is a dopant having redox properties, such as, e.g. hydroquinone sulfonic acid, ferrocene sulfonic acid, anthraquinonesulfonic acid and Co phthalocyanine trisulfonic acid.

It should be noted that the first and/or the second layer (and any layer arranged between these layers) may contain more than one dopant. Also, the dopant(s) used in the first layer may be the same as or different from the dopant(s) used in the second layer.

The weight ratio of the inherently conductive polymer(s) and the dopant(s) in both the first layer and the second layer will usually be not higher than about 3:1, e.g., not higher than about 2.5:1, and will usually be not lower than about 1.5:1, e.g., not lower than about 1.8:1.

The first layer and/or the second layer may further comprise carbon particles as optional component, for example, to further increase the capacitance of the electrode. These carbon particles which may be present in the form of, for example, fibers, flakes, spheres and the like will usually have a specific surface area (as determined by the BET method using nitrogen gas) of at least about 4 $m^2/g$, e.g., at least about 5 $m^2/g$, or at least about 6 $m^2/g$. If present, the concentration of the carbon particles in a specific layer will usually be not lower than about 2% by weight, e.g., not lower than about 3% by weight, and will usually be not higher than about 6% by weight, e.g., not higher than about 5% by weight. These percentages are based on the dry weight of the inherently conductive polymer or polymers present in the respective layer.

The carbon particles can be mixed with the neat inherently conductive polymer(s), or can be added to any liquid containing the polymer(s). In a preferred embodiment, the polymer is made (e.g., by chemical and/or electrochemical polymerization) in the presence of the carbon particles.

In addition to, or instead of, the carbon particles, the first and/or the second layer may further comprise Pb and/or a transition metal (optionally in partly or completely oxidized form), in finely divided form as optional component, for example, to further increase the capacitance of the electrode of the present invention. The transition metal may be any metal that can withstand an acidic environment (as created by, for example, the dopant). Non-limiting examples of suitable transition metals are Ir, Ru, Rh, Pd, Pt, Cd and combinations of two or more thereof. The Pb and/or transition metal will usually be present in an amount of less than about 0.1% by weight, e.g., less than 0.01% by weight, based on the dry weight of the inherently conductive polymer or polymers present in the respective layer.

In a preferred embodiment, the transition metal (or an oxidized form thereof) will be present as a very thin layer (e.g., a monolayer or submonolayer) generated by, e.g., electrochemical reduction or thermal decomposition of a transition metal salt. In the case of an electrochemical reduction, the porous carbon substrate having the first layer or the first and second layers thereon will serve as the cathode.

By way of non-limiting example, the electrochemical deposition of metal particles can be performed by means of a potentiostatic reduction at a potential of, e.g., about −0.3 V (vs. SCE) for about 20 min in an electrolyte which contains a corresponding metal salt, or by means of a galvanostatic reduction at a current density of, e.g., about −4 mA/cm$^2$ for about 30 min in the electrolyte which contains the metal salt. An optional oxidation of a deposited metal may, for example, be accomplished by an electrochemical oxidation thereof at a potential of 0.6-0.9 V in a supporting electrolyte. A chemical deposition of metal particles on a previously electrochemically formed (e.g., by using an electrochemical potentiostatic or galvanostatic process) inherently conductive polymer layer may be accomplished by soaking this layer in a metal salt solution and subsequent drying and thermal decomposition.

The total thickness of the electrode of the present invention depends on the thickness of the porous carbon substrate and the number and thickness of the layers arranged thereon. For a two-dimensional porous carbon substrate, the electrode will usually have a total thickness (average of at least five measurements) which is not lower than about 0.1 mm, e.g., not lower than about 0.2 mm, and not higher than about 2 mm, e.g., not higher than about 1 mm.

The electrode of the present invention may have an area capacitance of at least about 1.5 F/cm$^2$, e.g., at least about 1.8 F/cm$^2$, at least about 2 F/cm$^2$, or at least about 2.1 F/cm$^2$, and/or a capacitance density of at least about 40 F/cm$^3$, e.g., at least about 50 F/cm$^3$, or at least about 60 F/cm$^3$, and/or a specific capacitance of at least about 70 F/g, e.g., at least about 100 F/g, at least about 110 F/g, or at least about 120 F/g.

The electrode of the present invention may be made by a process in which the first or innermost layer is formed on the carbon substrate and thereafter the second or outermost layer is formed on said first layer or on any layer that may have been formed on the first layer after the formation of the latter. It will be apparent to those skilled in the art that the methods for forming the first and second and any optional additional layers are not particularly limited as long as they are capable of producing a layer of sufficient thickness and uniformity on the substrate and are compatible with the inherently conductive polymers (e.g., in terms of stability of these polymers). Suitable processes include many of those which are conventionally used for coating substrates, e.g., spraying, dipping, brushing, roller coating, deposition, etc.

Preferred processes for the purposes of the present invention include a dipping process in which the substrate is dipped into a liquid (e.g., a dispersion) which contains the inherently conductive polymer and, optionally other materials such as, e.g., carbon particles and finely divided transition metals; and an in situ process in which the polymer is formed in the presence of the substrate to be coated therewith. Preferred examples of such an in situ process include a chemical or electrochemical polymerization in the presence of the carbon substrate (which may already have one or more layers thereon).

With respect to the dipping process (which is one of the preferred processes for forming the first layer), non-limiting examples of the liquid which contains the inherently conductive polymer are a solution, a dispersion and an emulsion of the inherently conductive polymer in water, one or more organic solvents or any combination thereof. Non-limiting examples of the organic solvent include aromatic and aliphatic hydrocarbons which may optionally be halogenated, aliphatic and cycloaliphatic alcohols (such as methanol, ethanol, propanol, isopropanol and cyclohexanol), phenols, cresols (e.g., m-cresol), and the like. For example, the organic solvent may comprise an aromatic hydrocarbon such as, e.g., benzene, toluene and the xylenes.

Usually, the inherently conductive polymer contained in the dispersion for the dipping process will be doped by at least one dopant, e.g., one of the dopants set forth above. However, for the preparation of the dispersion one can also use an undoped inherently conductive polymer and separately incorporate one or more dopants into the dispersion, whereby the doping of the inherently conductive polymer takes place in situ in the dispersion. Moreover, if one does not consider the dopant already incorporated into the inherently conductive polymer to be particularly desirable for the purposes of the present invention, this dopant can be replaced by a different dopant once the first or second layer has been formed on the substrate, for example, by contacting the layer with a liquid that contains said different dopant.

The dipping liquid (e.g., the dispersion) will usually contain the inherently conductive polymer(s) in an amount which is not lower than about 3% by weight, e.g., not lower than about 5% by weight, and not higher than about 10% by weight, e.g., not higher than about 8% by weight. These percentages are based on the total weight of the dipping liquid.

Furthermore, if a dopant is present in the dipping liquid, the molar ratio: monomer units constituting the inherently conductive polymer(s)/dopant(s) will usually be not higher than about 2:1, and not lower than about 1:1.

Another preferred process for forming the first and/or the second layer on the carbon substrate, particularly, the first layer, comprises the chemical polymerization of the one or more monomers for forming the desired inherently conductive polymer in the presence of said carbon substrate. This chemical polymerization may comprise the oxidation of said one or more monomers. Corresponding processes are well known to those skilled in the art and are disclosed, e.g., in the documents mentioned above and the literature cited therein. The Examples given below may also be referred to in this regard. Briefly, the one or more monomers (neat or dissolved, dispersed or emulsified in an aqueous and/or organic liquid) are contacted with an oxidant. For example, the carbon substrate may have been treated with the oxidant beforehand (e.g., dipped into a liquid containing the oxidant). Contacting the one or more monomers with the thus treated substrate under suitable conditions will bring about the polymerization of the monomers to form the desired polymer. According to another embodiment, the oxidant may be added to the liquid which comprises the one or more monomers and is in contact with the carbon substrate. For a non-limiting example of a chemical oxidation process suitable for use in the present invention the Examples herein below may be referred to.

Non-limiting examples of oxidants for use in the present invention are oxygen-containing compounds, for example, peroxy acids and their salts (such as, e.g., peroxydisulfuric acid and its alkali metal and ammonium salts, for example, ammonium peroxydisulfate). Peroxyborates and peroxychromates, such as, e.g., sodium perborate, and ammonium dichromate, may also be used as oxidants. Further non-limiting examples of suitable oxidants include permanganates, such as, e.g., ammonium permanganate, iodates, such as, e.g., sodium iodate, and hydrogen peroxide.

The chemical polymerization will usually be carried out in the additional presence of the desired dopant(s), e.g., an organic acid and/or an inorganic acid having a $pK_a$ value of not higher than about 2.

Moreover, the polymerization may optionally be carried out in the additional presence of the carbon particles set forth above. In this way, the polymer will be formed (also) on the surface of the carbon particles.

Another preferred process for forming the first layer and, particularly, the second layer on the carbon substrate comprises the electrochemical polymerization of the one or more monomers for forming the desired inherently conductive polymer in the presence of said carbon substrate. Corresponding processes are well known to those skilled in the art and are disclosed, e.g., in the documents mentioned above and the literature cited therein. The Examples given below may also be referred to in this regard.

For example, the one or more monomers may be polymerized in an electrochemical cell which uses the carbon substrate, or the carbon substrate having the first layer thereon, as working anode. This electrochemical deposition (electro-polymerization) may, for example, be carried out by cyclic voltammetry.

The electrochemical polymerization will usually be carried out in the additional presence of the desired dopant(s), e.g., an organic acid and/or an inorganic acid having a $pK_a$ value of not higher than about 2. In this case, the dopant will also serve as the or one of the electrolytes.

By way of non-limiting example, an electrochemical polymerization may be performed in an electrochemical cell comprising a glass or plastic vessel, a reference electrode (saturated calomel electrode (SCE) or silver/silver chloride electrode), a counter electrode comprising a metal plate or grid made of, e.g., Pt, Au, Ni, Ti, stainless steel etc., and a working electrode. The working electrode is the carbon substrate which may, e.g., already be coated with the first inherently conductive polymer layer. A solution (e.g., an aqueous solution) of the corresponding monomer (e.g., aniline) and one or more dopants in concentrations of from about 0.2 to about 1 mol/l and about 0.4 to about 3 mol/l, respectively, may be used as the electrolyte. The electrochemical polymerization may be carried out in cyclic voltammetry mode with the following non-limiting parameters: potential range −0.1 to 0.9 V (vs. SCE); scanning rate 100-200 mV/s; total number of cycles 50-300. Thereafter, the electrochemically coated substrate may be washed with a solution of an appropriate acid and dried.

The electropolymerization may optionally be carried out in the additional presence of the carbon particles set forth above. In this way, the polymer will be formed (also) on the surface of the carbon particles.

The electrochemical capacitor of the present invention comprises at least one electrode of the present invention as set forth above. If both electrodes of the electrochemical capacitor are electrodes of the present invention, they may be the same (i.e., the carbon substrates and the compositions of the first, second and any optional additional layers of both electrodes are the same) or different. If different, at least one of the inherently conductive polymers of the first electrode may be different from at least one of the inherently conductive polymers of the second electrode. Alternatively or additionally, at least one of the dopants of the first electrode may be different from at least one of the dopants of the second electrode. The use of different electrodes may result in, e.g., an increase of the voltage of the capacitor (in this regard, see, for example, the explanations given in U.S. Pat. No. 5,527,640, the entire disclosure of which is hereby incorporated by reference herein).

The electrolyte included in the electrochemical capacitor of the present invention, may be present in the form of a liquid (including a paste and the like) or in solid form (e.g., embedded in a polymeric membrane). Electrolytes suitable for use in the present invention are well known to those skilled in the art, and essentially any compound that is sufficiently stable and is capable of forming (dissociate into) positively and negatively charged ions can be used, for example, inorganic and organic acids and bases and salts thereof. Preferably, the electrolyte is an acidic substance, e.g., a compound having a $pK_a$ value of not higher than about 2. Non-limiting examples of such compounds include inorganic acids and organic acids, specific examples whereof include those given above as examples of suitable dopants. Accordingly, the electrolyte used in the capacitor of the present invention may be the same as or different from the dopant(s) employed in any of the layers of the electrode(s).

DETAILED DESCRIPTION OF THE PRESENT INVENTION

The particulars shown herein are by way of non-limiting example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description making apparent to those skilled in the art how the several forms of the present invention may be embodied in practice.

In the Examples which follow, the capacitance properties of the coated carbon electrodes were determined by the following procedure:

Sample
  Rectangular sheet L=2 cm, W=1 cm.

Reagents
  0.5 mol/l sulfuric acid prepared with de-ionized water.

Equipment
  Potentiostat/galvanostat (EG&G PAR 263A) for cyclic voltammetry (CV) and chronopotentiometry (CP), SCE reference electrode, 3-electrode electrochemical cell equipped with bubbling means for inert gas, Pt counter electrode, and electrode holder with flat clamp (gold plated).

Procedure

The sample sheet is immersed into the electrolyte at a depth of 1 cm. Inert gas (nitrogen or argon) is passed through the electrolyte for 15 min before taking measurements. The procedure consists of two stages. First, the following sequence is performed: Potentiostatic pause at −0.1 V (vs. SCE)/2 min, then potential cycle in the range of from −0.1 V to 0.6 V at a scanning rate of 5 mV/s. The average capacitance is calculated as $\Delta I/2w$, where $\Delta I$ is the current difference between the anodic and cathodic branches of the CV curve at a potential of 0.3 V (SCE), and w is the scanning rate.

Then, the following chronopotentiometric sequence is performed: potentiostatic pause at −0.1 V (vs. SCE)/2 min, followed by a galvanostatic charging-discharging operation in the potential range of from −0.1 to 0.6 V at a constant current which is equal to the mean current of the CV curve (5-10 mA). The capacitance is calculated separately for the charging and the discharging process as $It/\Delta E$, where I is the charging/discharging current, t is the charging/discharging time in seconds, and $\Delta E$ is the potential range of the charging/discharging operation. The average capacitance is obtained as the arithmetic mean of the values measured at the anode and the cathode.

EXAMPLE 1

A polyaniline (PANI) containing layer was formed on a carbon electrode by chemical polymerization. In particular, aniline (11.6 ml, 0.125 mol) was added dropwise to a solution of methanesulfonic acid (16.2 ml, 0.25 mol) in 300 ml water. The resultant mixture was cooled to 2° C., whereafter a carbon electrode (V92 CH 1322; W. L. Gore & Associates, Inc., Newark, Del.; 2.5×2.5 cm; weight=0.843 g; capacitance 0.01 F/cm$^2$ or 0.45 F/cm$^3$ or 0.95 F/g) was immersed in the mixture, followed by the dropwise addition (1 drop per second) of 73 ml of an aqueous solution of 32.9 g (0.144 mol) of ammonium peroxydisulfate (($NH_4$)$_2$$S_2$$O_8$) at a temperature of 2-3° C. Upon completion of the addition, the mixture was stirred with cooling for 3 hours, and then overnight without cooling. Thereafter, the electrode was taken out of the mixture, washed three times with distilled water and then dried for 30 minutes at 70° C. under vacuum. The weight of the resultant coated electrode was 1.01 g, corresponding to a weight increase of 19.8%, and it showed a surface resistance (measured by the 4-point probe method according to ASTM F84-99, the entire disclosure of which is hereby incorporated by reference herein) of 2 Ohm/Sq and an area capacitance of 0.6 F/cm$^2$.

EXAMPLE 2

(a) Preparation of Doped Polyaniline

Under continuos stirring, freshly distilled aniline (16.35 ml, 0.176 mol) was added to a solution of 56.6 g (0.0176 mol) of dodecylbenzenesulfonic acid in 900 ml of water. Following the dissolution of the formed salt, the resultant mixture was cooled to 0° C., and an aqueous solution of 44.2 g of ammonium peroxydisulfate in 0.100 ml of water was added thereto over a period of 30 minutes with vigorous stirring. Upon completion of the addition, the reaction mixture was allowed to warm to room temperature and was stirred at this temperature overnight. Then, 900 ml of methanol were added to the reaction mixture and the resultant precipitate was filtered and washed five times with water, and then with methanol until the washing liquid became colorless. The washed filter cake was dried in air for 60 minutes, and then under vacuum at 70° C. until the weight remained constant. Yield of doped polyaniline: 48.3%.

(b) Preparation of Coated Electrode 2.5 g of the doped polyaniline of step (a) above, 50 ml of xylene (mixture of isomers) and 2 g of dodecylbenzenesulfonic acid were subjected to a milling operation in a ball mill (Planetary Mono Mill "Pulverisette 6", available from company FRITSCH, Industriestrasse 8, D-55743 Idar-Oberstein, Germany) for 4 hours at room temperature and at a stirring speed of 400 rpm. A carbon electrode like that used in Example 1 (weight: 0.194 g) was then immersed in the resultant dispersion for 5 minutes. Thereafter, the electrode was dried, first for 30 minutes in air at room temperature and then for 30 minutes at 70° C. under vacuum. The weight increase of the electrode was 17.5%, and it showed a surface resistance of 3 Ohm/Sq and an area capacitance of 0.55 F/cm$^2$.

EXAMPLE 3

A coated electrode obtained as described in Example 2 was redoped (exchange of dopant) by immersing the dried electrode for 12 hours into 30 ml of aqueous ammonia (3% by weight). The electrode was then washed 3 times with distilled water and thereafter immersed for 3 hours into 30 ml of a 5% by weight aqueous solution of methanesulfonic acid. After drying the thus treated electrode for 30 minutes in air at room temperature and for 30 minutes at 70° C. under vacuum, the total weight increase of the electrode was 13% and it showed a surface resistance of 4 Ohm/Sq and an area capacitance of 0.4 F/cm$^2$.

EXAMPLE 4

A PANI coated electrode was made as described in Example 2. On this coated electrode a second PANI layer was formed by electrochemical polymerization of aniline with fluoroboric acid as dopant in an aqueous electrolyte. In particular, the process was carried out in a three-electrode electrochemical cell with an SCE (Saturated Calomel Electrode) as reference electrode and a Ni grid as counter electrode. The volume of the electrolyte was 50 ml, the concentration of aniline was 0.5 mol/l, and the concentration of $HBF_4$ was 1 mole/l. Nitrogen gas was passes over the electrolyte. The PANI coated electrode was immersed into the electrolyte (size of the immersed part: 1.5 cm×1 cm). The polymerization was performed by means of cyclic voltammetry in the potential range of from −0.1 to 0.9 V with a scanning rate of 100 mV/s, a total number of cycles of 200, and a total time 400 s. The thus coated electrode was washed twice with aqueous $HBF_4$ (0.5 mol/l) and then dried at 70° C. under vacuum for 3 hours. The total weight increase of the resultant electrode (including the first and the second layers) was 56% and it showed an area capacitance of 2.0 F/cm$^2$ (53 F/cm$^3$ or 112 F/g).

EXAMPLE 5

Example 4 was exactly repeated, except that the $HBF_4$ was replaced by $H_2SO_4$ (1 mol/l). The total weight increase of the resultant electrode was 67% and it showed an area capacitance of 2.2 F/cm² (73.3 F/cm³ or 113 F/g).

EXAMPLE 6

Example 4 was exactly repeated, except that the $HBF_4$ was replaced by poly(styrenesulfonic acid) (0.44 mol/l) and the aniline concentration was 0.22 mol/l. The total weight increase of the resultant electrode was 39% and it showed an area capacitance of 2.4 F/cm² (60 F/cm³ or 116 F/g).

EXAMPLE 7

2.5 g of the doped polyaniline prepared as described in Example 2(a) above, 50 ml of xylene (mixture of isomers), 2.5 g of graphite flakes (sold by company Aldrich under the designation Graphite Flakes Product Number 33, 246-1; particle size <1 µm) and 2 g of dodecylbenzenesulfonic acid were subjected to a milling operation in the ball mill used in Example 2 for 4 hours at room temperature and at a stirring speed of 400 rpm. A carbon electrode like that used in Example 1 was then immersed into the resultant dispersion for 5 minutes. Thereafter, the electrode was dried for 30 minutes at 70° C. under vacuum. The weight increase of the electrode was 112.4%, and it showed a surface resistance of 0.3 Ohm/Sq and an area capacitance of 1 F/cm².

In the following Table, some properties of commercially available uncoated and coated carbon electrodes, including the electrodes of Examples 1 to 6, are summarized (all uncoated electrodes are available from W. L. Gore & Associates, Inc., Newark, Del under the indicated designations). In this Table, "PANI Dispersion #2" was prepared as described in Hong-Quan Xie, Yong-Mi Ma & Ding-Song Feng, "Preparation of Organosoluble Conductive Polyaniline via Precipitation Polymerization and Study of its Conductivity", European Polymer Journal 2000, 36:10:2201-2206, the entire disclosure of which is hereby incorporated by reference herein.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

TABLE

Properties of Uncoated and Coated Electrodes

| Electrodes | Thickness mm | Area Density mg/cm² | Rs Ohm/sq | Area Capacitance F/cm² | Capacitance Density F/cm³ | Specific Capacitance* F/g | C*V Density** F*V/cm³ |
|---|---|---|---|---|---|---|---|
| Uncoated | | | | | | | |
| 100CP CH230258 | 0.10 | 4.2 | <1 | N/a | N/a | N/a | N/a |
| V92 CH 1322-145A | 0.22 | 10.7 | 10 | 0.01 | 0.45 | 0.93 | 0.45 |
| 150GI CHO80385 | 0.15 | 10 | 70 | 0.16 | 10.7 | 16 | 10.7 |
| 100CAC CH141090 | 1.2 | 13 | 100 | 1.2 | 10 | 92 | 10 |
| 80PWA CH230660 | 0.22 | 16 | ~300 | 0.017 | 0.77 | 1.0 | 0.77 |
| Coated with PANI Dispersion #1 | | | | | | | |
| EXAMPLE 2 | 0.28 | 21 | 3 | 0.55 | 19.6 | 26 | 14.7 |
| 100CAC CH141090 | ~1.5 | 39 | 8 | 1.4 | 9.3 | 36 | 7.0 |
| Coated with PANI Dispersion #2 | | | | | | | |
| V92 CH 1322-145A | 0.26 | 14.7 | 6 | 0.1 | 3.8 | 6.8 | 2.8 |
| 100CAC CH141090 | ~1.5 | 35 | 20 | 1.6 | 10.7 | 46 | 8.0 |
| Coated with Chemical PANI | | | | | | | |
| EXAMPLE 3 | 0.24 | 19.8 | 4 | 0.4 | 16.7 | 20 | 12.5 |
| EXAMPLE 1 | 0.27 | 13 | 2 | 0.6 | 22.2 | 46 | 16.6 |
| Coated with PANI Dispersion/Electrochem. PANI | | | | | | | |
| EXAMPLE 5 | 0.30 | 19.5 | | 2.2 | 73.3 | 113 | 55.0 |
| EXAMPLE 6 | 0.40 | 20.6 | | 2.4 | 60 | 116 | 45.0 |
| EXAMPLE 4 | 0.38 | 17.8 | | 2.0 | 53 | 112 | 39.7 |

*Capacitance data are overall values and relate to whole composite
**Operating voltage taken for the C*V product calculation is 1 Volt for uncoated carbon electrodes and 0.75 Volt for PANI coated electrodes, respectively

What is claimed is:

1. An electrochemical capacitor comprising a first electrode, a second electrode and an electrolyte, wherein at least one of said first and second electrodes comprises a porous carbon substrate having thereon at least a first or innermost layer comprising a first inherently conductive polymer and a second or outermost layer comprising a second inherently conductive polymer.

2. The electrochemical capacitor of claim 1, wherein the porous carbon substrate has a specific surface area of at least about 20 m²/g.

3. The electrochemical capacitor of claim 2, wherein both of said first and second electrodes comprise a porous carbon substrate having thereon at least a first or innermost layer comprising a first inherently conductive polymer and a second or outermost layer comprising a second inherently conductive polymer.

4. The electrochemical capacitor of claim 3, wherein at least one of the inherently conductive polymers of the first electrode is different from at least one of the inherently conductive polymers of the second electrode.

5. The electrochemical capacitor of claim 4, wherein the first and second inherently conductive polymers of the first electrode comprise the same monomer units.

6. The electrochemical capacitor of claim 5, wherein the first and second inherently conductive polymers of the second electrode comprise the same monomer units.

7. The electrochemical capacitor of claim 2, wherein the porous carbon substrate is selected from a carbon felt, a non-woven carbon cloth, and pressed carbon fibers.

8. The electrochemical capacitor of claim 7, wherein the first inherently conductive polymer and the second inherently conductive polymer comprise the same monomer units.

9. The electrochemical capacitor of claim 2, wherein the porous carbon substrate further comprises a binder.

10. The electrochemical capacitor of claim 9, wherein the binder comprises polytetrafluoroethylene.

11. The electrochemical capacitor of claim 10, wherein the carbon substrate has a two-dimensional structure.

12. The electrochemical capacitor of claim 11, wherein the weight ratio of the carbon of the carbon substrate and the first layer is from about 1:0.5 to about 1:10.

13. The electrochemical capacitor of claim 12, wherein the weight ratio of the first layer and the second layer is from about 1:0.5 to about 1:5.

14. The electrochemical capacitor of claim 10, wherein the first layer has been formed by a process comprising at least one of a dipping process and a chemical polymerization process in the presence of the carbon substrate.

15. The electrochemical capacitor of claim 14, wherein the second layer has been formed by a process comprising an electrochemical polymerization process in the presence of the carbon substrate.

16. The electrochemical capacitor of claim 2, wherein the first layer and the second layer both further comprise a dopant having a $pK_a$ value of not higher than about 2.

17. The electrochemical capacitor of claim 16, wherein the dopant comprises at least one of an organic acid and an inorganic acid.

18. The electrochemical capacitor of claim 16, wherein the dopant comprises a sulfonic acid.

19. The electrochemical capacitor of claim 16, wherein the dopant comprises at least one of $H_2SO_4$ and $HBF_4$.

20. The electrochemical capacitor of claim 1, wherein the first inherently conductive polymer and the second inherently conductive polymer both comprise one of polyaniline, polypyrrole, polythiophene and ring-substituted derivatives thereof.

21. The electrochemical capacitor of claim 1, wherein the electrolyte comprises a liquid electrolyte.

22. The electrochemical capacitor of claim 1, wherein the electrolyte comprises a solid electrolyte which is arranged between said first and second electrodes.

23. The electrochemical capacitor of claim 22, wherein the solid electrolyte comprises a polymer membrane which is in contact with the first and second electrodes.

24. The electrochemical capacitor of claim 23, wherein the solid electrolyte further comprises at least one of an inorganic acid and an organic acid.

25. The electrochemical capacitor of claim 24, wherein the acid has a $pK_a$ value of not higher than about 2.

26. An electrical device which comprises the electrochemical capacitor of claim 1.

27. The electrical device of claim 26, which is selected from computers, telecommunication devices and consumer electronics devices.

28. An automobile which comprises the electrochemical capacitor of claim 1.

29. An industrial roboter which comprises the electrochemical capacitor of claim 1.

30. An electrode for an electrochemical capacitor, comprising a porous carbon substrate having thereon at least a first or innermost layer comprising a first inherently conductive polymer and a second or outermost layer comprising a second inherently conductive polymer.

31. The electrode of claim 30, wherein the porous carbon substrate has a specific surface area of at least about 20 $m^2/g$.

32. The electrode of claim 31, wherein the porous carbon substrate has a specific surface area of at least about 50 $m^2/g$.

33. The electrode of claim 31, wherein the porous carbon substrate comprises at least one of a carbon felt, a non-woven carbon cloth, and pressed carbon fibers.

34. The electrode of claim 31, wherein the porous carbon substrate further comprises a binder.

35. The electrode of claim 34, wherein the binder comprises polytetrafluoroethylene.

36. The electrode of claim 34, wherein the binder is present in an amount of about 5% by weight to about 40% by weight, based on the total weight of the carbon substrate.

37. The electrode of claim 31, wherein the carbon substrate has a two-dimensional structure.

38. The electrode of claim 37, wherein the carbon substrate has an average thickness of from about 0.04 mm to about 1 mm.

39. The electrode of claim 37, wherein the carbon substrate has a first outer surface and a second outer surface opposite the first outer surface and both of said outer surfaces have said first and second layers thereon.

40. The electrode of claim 39, wherein the electrode has an average total thickness of from about 0.1 mm to about 2 mm.

41. The electrode of claim 37, wherein the weight ratio of the carbon of the carbon substrate and the first layer is from about 1:0.5 to about 1:10.

42. The electrode of claim 41, wherein the weight ratio of the first layer and the second layer is from about 1:0.5 to about 1:5.

43. The electrode of claim 31, wherein the first inherently conductive polymer and the second inherently conductive polymer independently comprise one of polyaniline, polypyrrole, polythiophene and ring-substituted derivatives thereof.

44. The electrode of claim 31, wherein both the first inherently conductive polymer and the second inherently conductive polymer comprise polyaniline and wherein the first layer has been formed by at least one of a dipping process and a chemical polymerization process in the presence of the carbon substrate and the second layer has been formed by an electrochemical polymerization process in the presence of the carbon substrate having the first layer thereon.

45. The electrode of claim 44, wherein the electrode has an area capacitance of at least about 2.0 $F/cm^2$, a capacitance density of at least about 60 $F/cm^3$ and a specific capacitance of at least about 110 $F/g$.

46. The electrode of claim 31, wherein the first layer and the second layer further comprises carbon particles.

47. The electrode of claim 30, wherein the first layer and second layer independently have been formed by a process comprising at least one of a dipping process, a chemical polymerization process in the presence of the carbon substrate, and an electrochemical polymerization process in the presence of the carbon substrate.

48. The electrode of claim 47, wherein the first layer and the second layer have been formed by different processes.

49. The electrode of claim 47, wherein the first layer has been formed by a process comprising at least one of a dipping process and a chemical polymerization process.

50. The electrode of claim 47, wherein the second layer has been formed by a process comprising an electrochemical polymerization process.

51. The electrode of claim 48, wherein the first inherently conductive polymer and the second inherently conductive polymer comprise the same monomer units.

52. The electrode of claim 30, wherein the first inherently conductive polymer and the second inherently conductive polymer have main chains composed of monomer units comprising at least one of a heteroaromatic ring which comprises at least one of N, S and O and an aromatic ring which has at least one heteroatom bonded thereto.

53. The electrode of claim 52, wherein the at least one heteroatom comprises at least one of N, S and O.

54. The electrode of claim 52, wherein the at least one heteroatom comprises N.

55. The electrode of claim 30, wherein the first inherently conductive polymer comprises polyaniline.

56. The electrode of claim 30, wherein the second inherently conductive polymer comprises polyaniline.

57. The electrode of claim 30, wherein both the first layer and the second layer further comprise a dopant.

58. The electrode of claim 57, wherein the dopant comprises at least one of an organic acid and an inorganic acid.

59. The electrode of claim 58, wherein the dopant has a $pK_a$ value of not higher than about 2.

60. The electrode of claim 59, wherein the dopant comprises a sulfonic acid.

61. The electrode of claim 60, wherein the sulfonic acid comprises an aromatic sulfonic acid.

62. The electrode of claim 60, wherein the sulfonic acid comprises at least one of dodecylbenzenesulfonic acid, octylbenzenesulfonic acid, toluenesulfonic acid, benzenesulfonic acid, naphthalenesulfonic acid, naphthalenedisulfonic acid, pyrenesulfonic acid, methanesulfonic acid, trifluoromethanesulfonic acid, camphorsulfonic acid and polystyrenesulfonic acid.

63. The electrode of claim 60, wherein the sulfonic acid comprises at least one of dodecylbenzenesulfonic acid and polystyrenesulfonic acid.

64. The electrode of claim 58, wherein the dopant comprises at least one of a carboxylic acid, a sulfonic acid and a phosphonic acid.

65. The electrode of claim 58, wherein the dopant comprises at least one of $H_2SO_4$, $H_3PO_4$, $HBF_4$, $HPF_6$, $HAsF_6$, $HSbF_6$ and $HClO_4$.

66. The electrode of claim 58, wherein the weight ratio of the inherently conductive polymer and the dopant is in the range from about 3:1 to about 1.5:1 in both the first layer and the second layer.

67. The electrode of claim 58, wherein the dopant of the first layer and the dopant of the second layer are the same.

68. The electrode of claim 30, wherein the dopant of the first layer differs from the dopant of the second layer.

69. The electrode of claim 30, wherein at least one of the first layer and the second layer further comprises carbon particles.

70. The electrode of claim 69, wherein the carbon particles are in the form of at least one of fibers, flakes and spheres.

71. The electrode of claim 70, wherein the carbon particles have a specific surface area of at least about 4 $m^2/g$.

72. The electrode of claim 69, wherein the carbon particles are present in an amount of from about 2% by weight to about 6% by weight, based on the dry weight of the inherently conductive polymer in the respective layer.

73. The electrode of claim 30, wherein at least one of the first and second layers further comprises at least one of Pb and a transition metal in finely divided form.

74. The electrode of claim 73, wherein the transition metal comprises at least one of Ir, Ru, Rh, Pd, Pt and Cd.

75. The electrode of claim 30, wherein the electrode has at least one of an area capacitance of at least about 1.5 $F/cm^2$, a capacitance density of at least about 40 $F/cm^3$ and a specific capacitance of at least about 70 F/g.

76. The electrode of claim 30, wherein the electrode has at least one of an area capacitance of at least about 1.8 $F/cm^2$, a capacitance density of at least about 50 $F/cm^3$ and a specific capacitance of at least about 100 F/g.

77. A process for making an electrode for an electrochemical capacitor, wherein the process comprises forming at least a first or innermost layer comprising a first inherently conductive polymer and a second or outermost layer comprising a second inherently conductive polymer on a porous carbon substrate.

78. The process of claim 77, wherein the porous carbon substrate has a specific surface area of at least about 20 $m^2/g$.

79. The process of claim 78, wherein the porous carbon substrate comprises at least one of a carbon felt, a non-woven carbon cloth, and pressed carbon fibers.

80. The process of claim 79, wherein the carbon substrate has an average thickness of from about 0.04 mm to about 1 mm.

81. The process of claim 78, wherein the first layer is formed by a process which comprises dipping the carbon substrate into a liquid which contains said first inherently conductive polymer.

82. The process of claim 81, wherein the liquid comprises at least one of a solution, dispersion and emulsion which contains said first inherently conductive polymer and a solvent.

83. The process of claim 82, wherein the solvent comprises an organic solvent.

84. The process of claim 83, wherein the organic solvent comprises an aromatic hydrocarbon.

85. The process of claim 84, wherein the aromatic hydrocarbon comprises at least one of benzene, toluene and the xylenes.

86. The process of claim 82, wherein the liquid further contains a dopant having a $pK_a$ value of not higher than about 2.

87. The process of claim 81, wherein the first inherently conductive polymer is present in an amount of about 3% by weight to about 10% by weight, based on the total weight of said liquid.

88. The process of claim 87, wherein the weight ratio of the first inherently conductive polymer and the dopant is in the range from about 3:1 to about 1.5:1.

89. The process of claim 78, wherein the first layer is formed by a process which comprises a chemical polymerization of one or more monomers for said first inherently conductive polymer in the presence of said carbon substrate.

90. The process of claim 89, wherein the polymerization comprises contacting said one or more monomers with an oxidant.

91. The process of claim 90, wherein the carbon substrate carries the oxidant.

92. The process of claim 90, wherein the oxidant is added to the polymerization mixture.

93. The process of claim 90, wherein the polymerization is carried our in an aqueous medium.

94. The process of claim 89, wherein the polymerization is carried out in the additional presence of at least one of an organic acid and an inorganic acid having a $pK_a$ value of not higher than about 2.

95. The process of claim 94, wherein the weight ratio of the inherently conductive polymer and the acid is from about 3:1 to about 1.5:1.

96. The process of claim 89, wherein the polymerization is carried out in the additional presence of carbon particles having a specific surface area of at least about 4 $m^2/g$.

97. The process of claim 96, wherein the carbon particles are in the form of at least one of fibers, flakes and spheres.

98. The process of claim 97, wherein the carbon particles are employed in an amount of from about 2% by weight to about 6% by weight, based on the dry weight of the inherently conductive polymer.

99. The process of claim 78, wherein the first layer is formed by a process which comprises dipping the carbon substrate into a liquid which contains said first inherently conductive polymer and wherein the second layer is formed by a process which comprises an electrochemical polymerization of one or more monomers for said second inherently conductive polymer in the presence of the carbon substrate having said first layer thereon.

100. The process of claim 99, wherein the first inherently conductive polymer and the second inherently conductive polymer both comprise polyaniline.

101. The process of claim 78, wherein the first layer is formed by a process which comprises a chemical polymerization of one or more monomers for said first inherently conductive polymer in the presence of said carbon substrate and wherein the second layer is formed by a process which comprises an electrochemical polymerization of one or more monomers for said second inherently conductive polymer in the presence of the carbon substrate having said first layer thereon.

102. The process of claim 101, wherein the first inherently conductive polymer and the second inherently conductive polymer both comprise polyaniline.

103. The process of claim 78, wherein the carbon substrate has a two-dimensional structure.

104. The process of claim 103, wherein the weight ratio of the carbon of the carbon substrate and the first layer is from about 1:0.5 to about 1:10.

105. The process of claim 104, wherein the weight ratio of the first layer and the second layer is from about 1:0.5 to about 1:5.

106. The process of claim 78, wherein both the first inherently conductive polymer and the second inherently conductive polymer independently comprise one of polyaniline, polypyrrole, polythiophene and ring-substituted derivatives thereof.

107. The process of claim 77, wherein the second layer is formed by a process which comprises an electrochemical polymerization of one or more monomers for said second inherently conductive polymer in the presence of said carbon substrate having said first layer thereon.

108. The process of claim 107, wherein the polymerization is carried out in an aqueous medium.

109. The process of claim 107, wherein the polymerization is carried out in the additional presence of at least one of an organic acid and an inorganic acid having a $pK_a$ value of not higher than about 2.

110. The process of claim 109, wherein the weight ratio of the inherently conductive polymer and the acid is from about 3:1 to about 1.5:1.

111. The process of claim 109, wherein the polymerization is carried out in the additional presence of carbon particles having a specific surface area of at least about 4 $m^2/g$.

112. The process of claim 111, wherein the carbon particles are employed in an amount of from about 2% by weight to about 6% by weight, based on the dry weight of the finished inherently conductive polymer.

113. The process of claim 107, wherein the electrochemical polymerization is carried out by a process comprising cyclic voltammetry.

114. The process of claim 77, wherein the first inherently conductive polymer and the second inherently conductive polymer comprise the same monomer units.

115. An electrode for an electrochemical capacitor made by the process of claim 77.

* * * * *